Inventors:-
Leo. T. Kilpinen
William A. Morris
By
Attorney

2,932,110

FISH LURE

Leo T. Kilpinen and William A. Morris,
Sudbury, Ontario, Canada

Application April 11, 1957, Serial No. 652,213

1 Claim. (Cl. 43—17.1)

This invention relates to fish lures.

It is an established scientific fact that fish respond to various sound frequencies, and it is a general object of this invention to utilize this fact in association with a fish lure.

More particularly, it is an object of this invention to provide a lure arranged to produce sounds electrically and to transmit them to surrounding water whereby resulting vibrations may be sensed by the fish and whereby the fish may be attracted to the source of the vibrations centered in the lure itself.

Another object is to provide a lure having an electrically operated vibrator therein, said vibrator having a frequency closely controllable for attraction by fish, and adapted to produce continuous sounds at the desired frequency necessary to attract different species of fish.

Another object is to provide a lure of relatively small size but adapted to produce vibrations of greater intensity than possible in mechanical sound-producing lures.

The invention will be described with reference to the accompanying drawing, in which—

Figure 1:
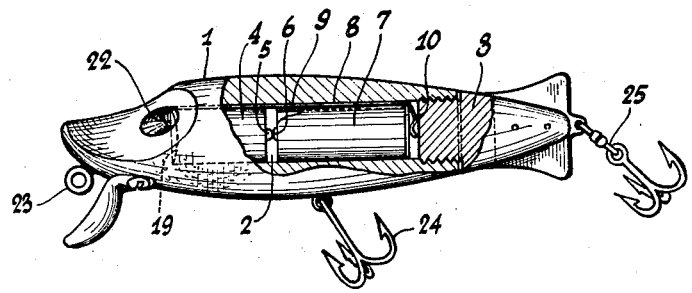
Figure 1 is a side elevation, partly in section, of a fish lure in accordance with the invention.
Figure 2:
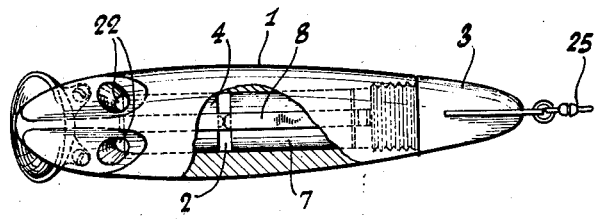
Figure 2 is a sectional plan view of the lure.

In the drawing, 1 is a housing or body having an external shape which may simulate that of a fish, as shown. The body has a cylindrical cavity 2 therein extending longitudinally thereof and closable by a screw-threaded cap 3 constituting the tail end of the body. A cylindrical vibrator or unit buzzer 4 is removably inserted in the forward end of the cavity and has an axial contact 5 for engagement with an axial contact 6 on a dry cell battery 7 also removably mounted in the cavity. A contact strip 8 of copper or like conducting material is also mounted in the cavity and has one end in engagement with the casing of buzzer 4. The strip 8 extends longitudinally along battery 7 but is insulated therefrom by means of insulation 9.

Any suitable switch or like means is provided to establish selective contact of contact strip 8 with battery 7 to complete the buzzer circuit. Thus, as shown, strip 8 may have a spring end portion 10 normally biased out of contact with the end of the battery casing but movable into contact therewith by inward movement of cap 3 as it threaded firmly into closing position. It will be understood that as the cap is unscrewed outwardly, pressure on the spring portion 10 is released and it moves out of contact with the battery.

Figure 3:
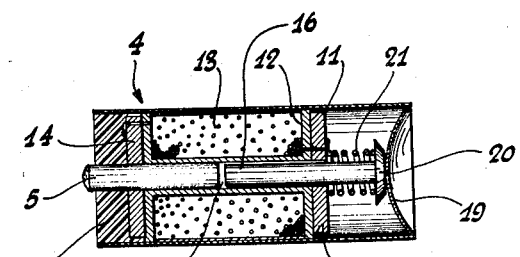
Figure 3 is a sectional side elevation of the buzzer portion of the lure.

Referring to Figure 3, the buzzer as shown comprises a soft iron casing 11 containing electromagnetic means including a spool 12 having a coil 13 thereon. The coil has an annular lead 14 at one end thereof through which axially extends fixed pole piece or contact pin 5, and an annular lead 15 of the other end thereof through which axially extends plunger 16. Pin 5 and plunger 16 extend into the bore of spool 12, their adjacent ends being separated by air gap 17. One end of casing 11 is hermetically sealed by a solid body of wax or the like 18 through which contact pin 5 extends. The other end of casing 11 is completely closed by a diaphragm 19. A contact 20 carried by the end of plunger 16 engages the interior surface of diaphragm 19 and is urged into contact therewith by a spring 21 mounted on plunger 16 and seated on lead 15.

It will be apparent that contact with battery 7 is made through contact pin 5 and that current thus flows to lead 14 of coil 13, thence through lead 15 to spring 21, plunger 16, contact 20, diaphragm 19 and casing 11. From casing 11, current flows through contact strip 8, switch portion 10 and thence to the negative terminal of battery 7.

When switch portion 10 is closed, coil 13 will be energized and plunger 16 attracted to contact pin 5 to compress spring 21 and open contact 20. Coil 13 will then become de-energized, allowing spring 21 to move plunger 16 into striking engagement with diaphragm 19 to produce one vibration. The cycle is then repeated to produce a series of vibrations.

A vibrator of the type shown will produce approximately 250 cycles per second but this frequency may be varied as desired by altering shape, size, thickness of material of diaphragm 19, or size and weight of plunger 16, or strength of spring 21. It will be understood that the vibrator unit is completely waterproof for normal angling depths.

In order that the vibrations may be transmitted to the surrounding water, the diaphragm 19 is exposed thereto through ports 22 in the head portion of body 1, such ports as shown simulating the eyes of a fish.

The lure is provided with a towing eye 23, and hooks 24 and 25 on the side and tail end of the body.

There has thus been provided a fish lure of simple structure and arranged to produce electrically vibrations of desired frequency to attract fish of different species.

It will be understood that various changes may be made in the structure described without departing from the spirit of the invention, as defined in the appended claim. For instance, the switch arrangement for placing the vibrator in operation may vary widely in detail, location and manner of actuation, as will be apparent to anyone skilled in the art.

We claim:

A fish bait comprising a fish simulating housing having a plurality of hooks secured thereto, a head portion, a tail portion, a cylindrical cavity therein, a fixed wall defining one end of said cavity, ports extending from the exterior of said head portion of said housing to said cavity wall, and a removable cap constituting said tail portion and having an inner surface defining the other end wall of said cavity, a vibrator slidably disposed within said acvity and having a waterproof casing completely enclosing said vibrator, said casing having a cylindrical wall of electrically conducting material, a diaphragm of electrically conducting material constituting one end wall of said casing, and another end wall of insulating material, a fixed contact member extending through said insulating end wall and in electrical contact with said cylindrical wall, an electromagnet in said casing, a plunger reciprocally mounted in said casing, a spring in said casing urging said plunger in one direction into electrical contact with said diaphragm, said plunger being movable in the opposite direction out of contact with said diaphragm in response to energization of said electromagnet, a battery for energizing said electromagnet slidably disposed in said cavity and having a pair of contacts, one of said battery contacts being in engagement with said contact member and a contact strip in electrical contact with said cylindrical wall and having a portion in contact with said other battery contact, said battery being thereby operable to energize said electromagnet when said plunger is in contact with said diaphragm and to deenergize said electromagnet when said plunger is out of contact with said diaphragm, said diaphragm being thereby vibratable in response to energization and de-energization of said electromagnet, said ports exposing said diaphragm to surrounding water for direct transmission of vibrations thereto, and said cap engaging said contact strip portion to maintain it in contact with said other battery contact.

References Cited in the file of this patent

UNITED STATES PATENTS

| | | |
|---|---|---|
| 1,269,005 | Shoenwolf | June 11, 1918 |
| 2,237,534 | Van Der Clute | Apr. 8, 1941 |
| 2,577,229 | Carnes | Dec. 4, 1951 |
| 2,754,610 | Carlson | July 17, 1956 |
| 2,757,475 | Pankove | Aug. 7, 1956 |
| 2,784,399 | Smith | Mar. 5, 1957 |